United States Patent
Jacobs et al.

(10) Patent No.: US 8,650,169 B1
(45) Date of Patent: Feb. 11, 2014

(54) METHOD AND MECHANISM FOR IDENTIFYING TRANSACTION ON A ROW OF DATA

(75) Inventors: Kenneth R. Jacobs, Los Altos Hills, CA (US); Amit Ganesh, San Jose, CA (US); Jonathan Klein, Redwood City, CA (US); Archna Kalra Johnson, Sunnyvale, CA (US); Vivekanandhan Raja, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1286 days.

(21) Appl. No.: 10/364,209

(22) Filed: Feb. 10, 2003

Related U.S. Application Data

(63) Continuation-in-part of application No. 09/676,305, filed on Sep. 29, 2000, now Pat. No. 6,631,374.

(51) Int. Cl.
*G06F 7/00* (2006.01)

(52) U.S. Cl.
USPC .......................................... 707/704

(58) Field of Classification Search
USPC ...... 707/9, 103 R, 201, 2, 3, 4, 5, 100, 104.1, 707/10
See application file for complete search history.

(56) References Cited

U.S. PATENT DOCUMENTS

| | | | |
|---|---|---|---|
| 4,498,145 A | 2/1985 | Baker et al. | |
| 4,868,744 A | 9/1989 | Reinsch et al. | |
| 5,249,300 A * | 9/1993 | Bachman et al. | 707/104.1 |
| 5,280,612 A | 1/1994 | Lorie et al. | |
| 5,317,731 A | 5/1994 | Dias et al. | |
| 5,347,653 A | 9/1994 | Flynn et al. | |
| 5,363,473 A | 11/1994 | Stolfo et al. | |
| 5,440,730 A | 8/1995 | Elmasri et al. | |
| 5,481,699 A | 1/1996 | Saether | |
| 5,524,205 A * | 6/1996 | Lomet et al. | 714/16 |
| 5,638,508 A | 6/1997 | Kanai et al. | |
| 5,701,480 A * | 12/1997 | Raz | 718/101 |
| 5,758,356 A | 5/1998 | Hara et al. | |
| 5,819,020 A | 10/1998 | Beeler, Jr. | |
| 5,835,698 A * | 11/1998 | Harris et al. | 714/15 |
| 5,845,292 A | 12/1998 | Bohannon et al. | |
| 5,850,507 A | 12/1998 | Ngai et al. | |

(Continued)

FOREIGN PATENT DOCUMENTS

FR  2 746 526 A1  9/1997

OTHER PUBLICATIONS

Lee, Chang et al., "Temporal Grid File: A file structure for interval data", Data & Knowledge Engineering 26, 1998, pp. 71-97.

(Continued)

*Primary Examiner* — Hosain Alam
*Assistant Examiner* — Eliyah S Harper
(74) *Attorney, Agent, or Firm* — Vista IP Law Group, LLP

(57) ABSTRACT

A method and mechanism for identifying one or more transactions that have modified or created an object in a database system. Also disclosed is a method and mechanism to compensate for the effects of a transaction in a database system is disclosed. The disclosed approach can be applied to perform auditing for changes and/or transactions in a database system and for identifying the scope of changes and data accesses made by a transaction in the system.

43 Claims, 10 Drawing Sheets

(56) References Cited

U.S. PATENT DOCUMENTS

| | | | |
|---|---|---|---|
| 5,862,318 A | | 1/1999 | Habben |
| 5,864,849 A | | 1/1999 | Bohannon et al. |
| 5,870,758 A | * | 2/1999 | Bamford et al. .................... 1/1 |
| 5,873,102 A | | 2/1999 | Bridge, Jr. et al. |
| 5,890,161 A | * | 3/1999 | Helland et al. ............ 707/103 R |
| 5,890,167 A | | 3/1999 | Bridge, Jr. et al. |
| 5,907,848 A | | 5/1999 | Zaiken et al. |
| 5,923,833 A | | 7/1999 | Freund et al. |
| 5,940,839 A | | 8/1999 | Chen et al. |
| 5,956,731 A | | 9/1999 | Bamford et al. |
| 5,966,706 A | | 10/1999 | Biliris et al. |
| 5,974,427 A | | 10/1999 | Reiter |
| 5,995,980 A | | 11/1999 | Olson et al. |
| 5,996,088 A | | 11/1999 | Frank et al. |
| 5,999,943 A | * | 12/1999 | Nori et al. ............................. 1/1 |
| 6,012,060 A | | 1/2000 | Loaiza et al. |
| 6,014,674 A | * | 1/2000 | McCargar ............................ 1/1 |
| 6,018,746 A | | 1/2000 | Hill et al. |
| 6,138,121 A | | 10/2000 | Costa et al. |
| 6,154,847 A | | 11/2000 | Schofield et al. |
| 6,173,292 B1 | | 1/2001 | Barber et al. |
| 6,182,241 B1 | | 1/2001 | Ngai et al. |
| 6,185,699 B1 | * | 2/2001 | Haderle et al. .................. 714/19 |
| 6,192,370 B1 | * | 2/2001 | Primsch ................... 707/103 R |
| 6,192,377 B1 | | 2/2001 | Ganesh et al. |
| 6,237,001 B1 | | 5/2001 | Bamford et al. |
| 6,321,234 B1 | * | 11/2001 | Debrunner ........................... 1/1 |
| 6,341,288 B1 | * | 1/2002 | Yach et al. ................ 707/103 R |
| 6,363,499 B1 | | 3/2002 | Delo et al. |
| 6,405,217 B1 | * | 6/2002 | Lee ............................... 707/200 |
| 6,438,749 B1 | | 8/2002 | Chamberlain |
| 6,449,624 B1 | | 9/2002 | Hammack et al. |
| 6,457,021 B1 | * | 9/2002 | Berkowitz et al. ............ 707/201 |
| 6,480,848 B1 | | 11/2002 | DeKimpe et al. |
| 6,513,093 B1 | * | 1/2003 | Chen et al. ........................ 711/4 |
| 6,529,921 B1 | * | 3/2003 | Berkowitz et al. ......... 715/500.1 |
| 6,567,928 B1 | | 5/2003 | Lyle et al. |
| 6,618,822 B1 | | 9/2003 | Loaiza et al. |
| 6,631,374 B1 | | 10/2003 | Klein et al. |
| 6,640,244 B1 | * | 10/2003 | Bowman-Amuah .......... 709/207 |
| 6,678,696 B1 | * | 1/2004 | Helland et al. ............ 707/103 R |
| 6,769,074 B2 | | 7/2004 | Vaitzblit |
| 6,801,915 B1 | * | 10/2004 | Mack ............................ 707/100 |
| 6,889,231 B1 | * | 5/2005 | Souder et al. ........................ 1/1 |
| 2002/0007363 A1 | * | 1/2002 | Vaitzblit ....................... 707/202 |
| 2004/0030954 A1 | | 2/2004 | Loaiza et al. |
| 2005/0125430 A1 | | 6/2005 | Souder et al. |
| 2005/0131966 A1 | * | 6/2005 | Lou ............................... 707/204 |
| 2005/0240633 A1 | | 10/2005 | Krishnaswamy et al. |
| 2006/0212492 A1 | | 9/2006 | Jacobs et al. |

OTHER PUBLICATIONS

Amagasa, Toshiyuki et al., "Implementing Time-Interval Class for Managing Temporal Data", International Workshop on Database and Expert Systems Applications, Aug. 28, 2003, pp. 84,88,843-849.

ORACLE8™ Concepts, vol. 1, Release 8.0, Dec. 1997, Oracle®, pp. 18-14, 21-8, and 24-8 through 24-20.

Perry, J.T. et al. Understanding Oracle, 1989, Sybex, 1st ed., pp. 4-7, 43, 95 and 161-164.

Weikum, et al. "Multi-Level Recovery" ACM (1990) pp. 109-123.

Strom et al. "Optimistic Recovery in Distributed Systems" ACM Transactions on Computer System (Aug. 1995) vol. 3, No. 3, pp. 204-226.

Gomes et al. "Multiplexed State Saving for Bounded Rollback" Proceedings of the 1997 Winder Simulation Conference, Atlanta, GA pp. 460-467.

Microsoft Word User's Guide, Microsoft Corporation, 1993, pp. 14, 15, 40.

Triantafillou, P. "Independent Recovery in Large-Scale Distributed Systems" IEEE Transactions on Software Engineering (Nov. 1996) vol. 22, No. 11, pp. 812-826.

Wiener, J.L. et al. "A System Prototype for Warehouse View Maintenance" VIEWS (1996) pp. 26-33 (provided reference has been numbered pp. 1-8).

Ramakrishnan, R., Database Management System, WCB/McGraw-Hill, 1998, pp. 529-533.

* cited by examiner

METHOD AND MECHANISM FOR IDENTIFYING TRANSACTION ON A ROW OF DATA

CROSS-REFERENCE TO RELATED APPLICATIONS

The present application is a continuation-in-part of U.S. Application Ser. No. 09/676,305, filed on Sep. 29, 2000, now U.S. Pat. No. 6,631,374, which is hereby incorporated by reference in its entirety.

BACKGROUND AND SUMMARY

The invention relates to computer systems, and more particularly to a method and mechanism for accessing and managing data in a database system.

In database systems, a "transaction" normally refers to an atomic set of operations performed against a database. The transaction may access, create, modify, or delete database data or database metadata while it is being processed. A "commit" occurs when the transaction has completed its processing and any changes to the database by the transaction are ready to be "permanently" implemented in the database system. Because the transaction is atomic, all actions taken by the transaction must be committed at the same time.

Transaction log records can be maintained in a database systems, e.g., to allow suitable recovery operations in the event of a system failure or aborted transaction. Some common problems that could cause a system failure or aborted transaction include hardware failure, network failure, process failure, database instance failure, data access conflicts, user errors, and statement failures in the database access programs (most often written in the structured query language or SQL).

Different types of transaction log records can be maintained in a database system. A common transaction logging strategy is to maintain "redo" records that log all changes made to the database. With "write ahead logging", each change to data is first recorded in the redo log, and only afterwards is that change actually made to the database block corresponding to the changed data. This protects against the situation when a system failure occurs and the version of the database data that is immediately restored from disk does not accurately reflect the most recent state of the database. This may occur because of changes to the data that have only occurred in cache, and have not been recorded to disk before the failure. If the redo log has been properly maintained for these cache-only changes, then recovery can be performed by applying the redo records to roll the database forward until it is consistent with the state that existed just before the system failure.

Another type of log record that may be maintained is the "undo" record, which can also be referred to as "rollback" segments. Undo records contain information about database actions that should be undone during certain database operations. For example, if the rolling forward process during recovery has applied uncommitted changes to the database, then undo records can be applied to remove uncommitted changes, thereby ensuring that only committed changes exist in the database after recovery. In addition, if a transaction is aborted, then undo records can be applied to return the database to its pre-existing state from prior to the aborted transaction. If a database uses multi-versioning to allow different transactions to view database data from different points in time, then undo records can be used to create multiple versions of the database that are consistent with the different points in time. An approach for implementing undo and redo records is disclosed in co-pending U.S. application Ser. No. 09/748,408, entitled, filed Dec. 22, 2000, which is hereby incorporated by reference in its entirety.

In conventional systems, a committed transaction comprises a set of one or more permanent changes that are made against a set of records in a database system. While different versions of the database records may be viewable under certain circumstances, since the committed changes for a transaction are normally permanent, the transactions themselves are not normally reversible. This presents a problem if a data error in a transaction is identified after the given transaction has already committed. Conventional database systems do not include built-in mechanisms to undo or compensate for the changes made by a committed transaction.

Some database systems allow an archived version of a database system to be restored to a particular point in time, usually by restoring the entire database as of the time that the "back up" archive was made. However, this approach restores an entire database, even though only a small set of one or more transactions may need to be undone or compensated for to correct a data error made by the transactions. This is a highly inefficient approach if only a relatively small number of changes or transactions must be corrected.

Accordingly, the present invention provides a method and system for identifying the one or more transactions that have modified or created an object, such as a row of data, in a database system. Also disclosed is a method and system for undoing, reversing, or compensating for a committed transaction in a database system. Further details of aspects, objects, and advantages of the invention are described below in the detailed description, drawings, and claims.

BRIEF DESCRIPTION OF THE DRAWINGS

The accompanying drawings are included to provide a further understanding of the invention and, together with the Detailed Description, serve to explain the principles of the invention. The same or similar elements in the figures may be referenced using the same reference numbers.

DETAILED DESCRIPTION

The present invention provides a method and mechanism for identifying one or more transactions that have modified or created an object in a database system. The present invention also provides a method and mechanism to compensate (e.g., to undo, reverse, or to correct) for the effects of a transaction in a database system. For the purpose of explanation, the following description will be made with respect to the storage/retrieval of relational data from a database. It is noted, however, that the present invention is applicable to managing and manipulating other types and granularities of data in a computing system, and thus is not to be limited to just relational data. It is further noted that the present invention can also be applied to perform auditing for changes and/or transactions in a database system. Thus, rather than rolling back or compensating for a transaction, the invention can be applied to identify and determine the scope of changes and data accesses made by a transaction in the system.

Figure 1:
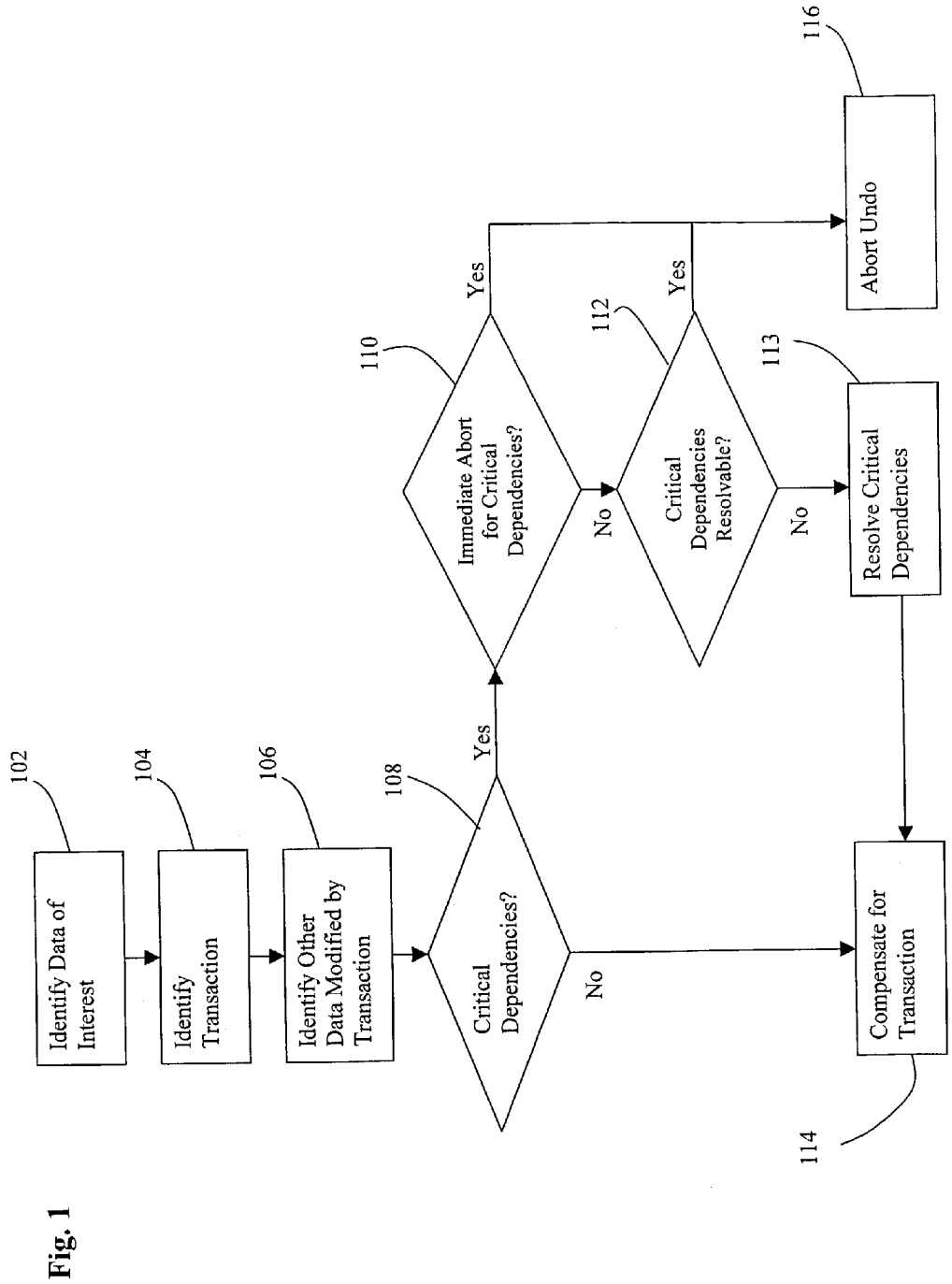
FIG. 1 shows a flowchart of a process to compensate for the effects of a committed transaction according to an embodiment of the invention.

FIG. 1 shows a high-level flowchart of a process to compensate for the effects of a transaction according to an embodiment of the invention. At 102, an action is performed to identify the data item of interest with respect to the present process. To illustrate this aspect of the invention, consider a database system that is used to process orders for a retail or mercantile company. This type of database system may be used to manage the flow of information relating to the sales and delivery of merchandise by that company, such as customer information, data relating to purchased products, delivery information, etc. Assume that an ordering error occurs with respect to a particular customer and the error was not identified until after the transaction for that order had already committed. If it is desired to compensate or undo that ordering error, then at 102, one or more rows in the merchant database system are identified which relate to the ordering error. The identified row may include, for example, the particular row in a "sales" table that contains the erroneous ordering data.

At 104, an identification is made of the particular transaction that performed the data access (e.g., modification or creation) for the data item identified in 102. For the identified transaction, all other data items created or modified by that transaction are thereafter identified at 106. For example, it is possible that the transaction identified in 104 that modified the identified row from 102 also modified rows in other tables, such as in the "payment" or "shipping" tables. The action of 106 will identify the other rows modified by the transaction.

A determination is made at 108 whether critical dependencies exist with respect to the transaction identified in 104. Such a critical dependency may exist, for example, if a subsequent transaction has accessed or modified any of the same data items that had been created or modified by the transaction identified in 104. This is likely to be a critical dependency since the subsequent transaction may have made a data change that is dependent for its correctness upon the prior change made by the transaction identified in 104. If no critical dependencies are identified, then compensation is made at 114 for the changes made by the identified transaction. An example approach to compensate for the transaction is to undo each data creation or modification made by the transaction identified in 104. The undo action can be performed in one embodiment by applying the undo record corresponding to the transaction.

If one or more critical dependencies are identified at 108, then a further determination is made regarding whether an immediate abort of the process should take place (110). The present process may be implemented such that an immediate abort should occur if any critical dependency is identified. If so, then the process is aborted at 116.

The process may also be implemented such that a further determination is made regarding whether the critical dependency is resolvable (112). For example, assume that an intervening transaction had modified one or more of the data items created or modified by the transaction identified in 104. Since the intervening transaction has made a data change that is dependent upon the prior change made by the transaction identified in 104, any compensation for the first transaction must not introduce errors in the database based upon the change made by the second transaction. One example approach to resolving the critical dependency is to simply roll back the subsequent transaction (assuming that the subsequent transaction does not itself have any un-resolvable dependencies). Each of the actions in FIG. 1 are described in more detail below.

At this point, it is helpful to generally describe an embodiment of a process for identifying a transaction that has modified or created a row in the database. This can be accomplished by first identifying a corresponding primary key for the data item of interest. A primary key uniquely identifies a row in a table in a database system. Once the primary key is identified, the ordered set of transactions that has modified the row/table having that primary key can be identified by mining the log records associated with that row. For example, a customer record may have as a primary key a "customer_id" value. Given a specific customer_id value, one may use the undo or redo records associated with the storage units for the row associated with that customer_id value to determine the transaction that has modified that row. By accessing these log records, information about the SQL executed by the transaction can be provided.

Figure 2:
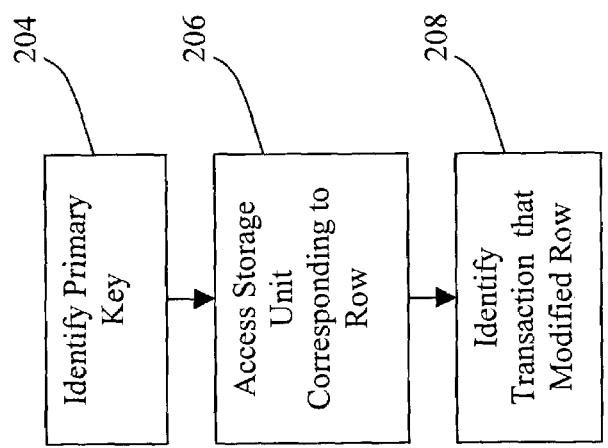
FIG. 2 shows a flowchart of a process for identifying a transaction that modified a data item according to an embodiment of the invention.

FIG. 2 shows a flowchart of a process for identifying a transaction that has modified a row in a database system, according to this embodiment of the invention. At 204, the primary key relating to the data item of interest is identified in the database. As noted above, the primary key can be identified, for example, by corresponding a table with the data item of interest to a particular primary key in that table associated with the data item. In one example, the data error of immediate interest is directly related to the identified data item that was modified by the transaction which the process is attempting to identify. In one embodiment, the storage unit for a data item is associated with or mapped to the primary key value for that data item, e.g., comprising a database block that is structured to store data for one or more rows of data, and is associated with the primary keys for those rows of data. Therefore, by first identifying the primary key related to the data item, the specific storage unit for the table and row of interest can thereafter be identified.

In an embodiment, a storage unit in the database is associated with a log structure that identifies the one or more transactions that access the rows in that storage unit. An example log structure to track the transactions that access the database block is an "interested transaction list" or "transaction list." For each transaction that accesses the database block, a corresponding entry is added to the interested transaction list for that block. The storage unit may further include or be associated with undo and redo log structures to store undo and redo information, respectively, for changes made to that storage unit. For the purposes of illustration, and not by way of limitation, the following explanation will be made with reference to these example log structures and storage units. Further details regarding an example approach for implementing these storage and log structures is disclosed in co-pending U.S. application Ser. No. 09/748,408, filed Dec. 22, 2000, which is hereby incorporated by reference in its entirety. An approach for using log structures to reconstruct data as of a particular point in time is disclosed in U.S. application Ser. No. 09/676,305, filed Sep. 29, 2000, which is hereby incorporated by reference in its entirety.

At 206, the process accesses the appropriate transaction list associated with the row/table of interest. In an embodiment, this action comprises accessing the transaction list in the block associated with the row. In a first approach, a transaction list may be associated with multiple rows in the block. In an alternate approach, a separate transaction list is maintained for each row in the block.

If a transaction list is associated with multiple rows, then the entries in the transaction list are reviewed to determine which, if any, relate to the row of interest. If the entries in the transaction list are not ordered, then an ordering action may be performed to identify the latest transaction that has accessed the rows associated with the list. This sorting may be performed, for example, based upon commit time information stored in the transaction list for each transaction identified in the transaction list. The ordered list of transactions can be used to gain a backwards step-by-step view of the changes that were applied to the block. By stepping backwards in time (based upon commit times), the latest transaction to modify the row of interest can be identified (208).

In an embodiment, each change to the database can be logged using an undo log. Each block can be associated with the latest undo record relating to that block. The undo record contains information that allows the block to be restored to a condition that existed prior to the most-recent change to that block. Applying the undo record will remove the latest change to that block. If the block itself contains a structure that points to the undo record, then applying the most recent undo record to that block will cause the block to be restored to contain the next-most-recent pointer to the next-most-recent undo record. Thus, in the present embodiment, the undo record restores not only data items and rows in the block, but also restores log structures such as the pointer to the appropriate undo record. Therefore, the undo records associated with a block can be used/applied to step backwards through the list of changes that occur to a block.

Taking the newest transaction first, the changes made by that transaction are removed or undone. A determination is made whether the change was applied to the row of interest. If not, another undo record is applied to step the block backwards in time. This process continues until a change is identified for the particular row of interest. Once this happens, the particular transaction associated with that change can be identified from the transaction list.

Figure 3A:
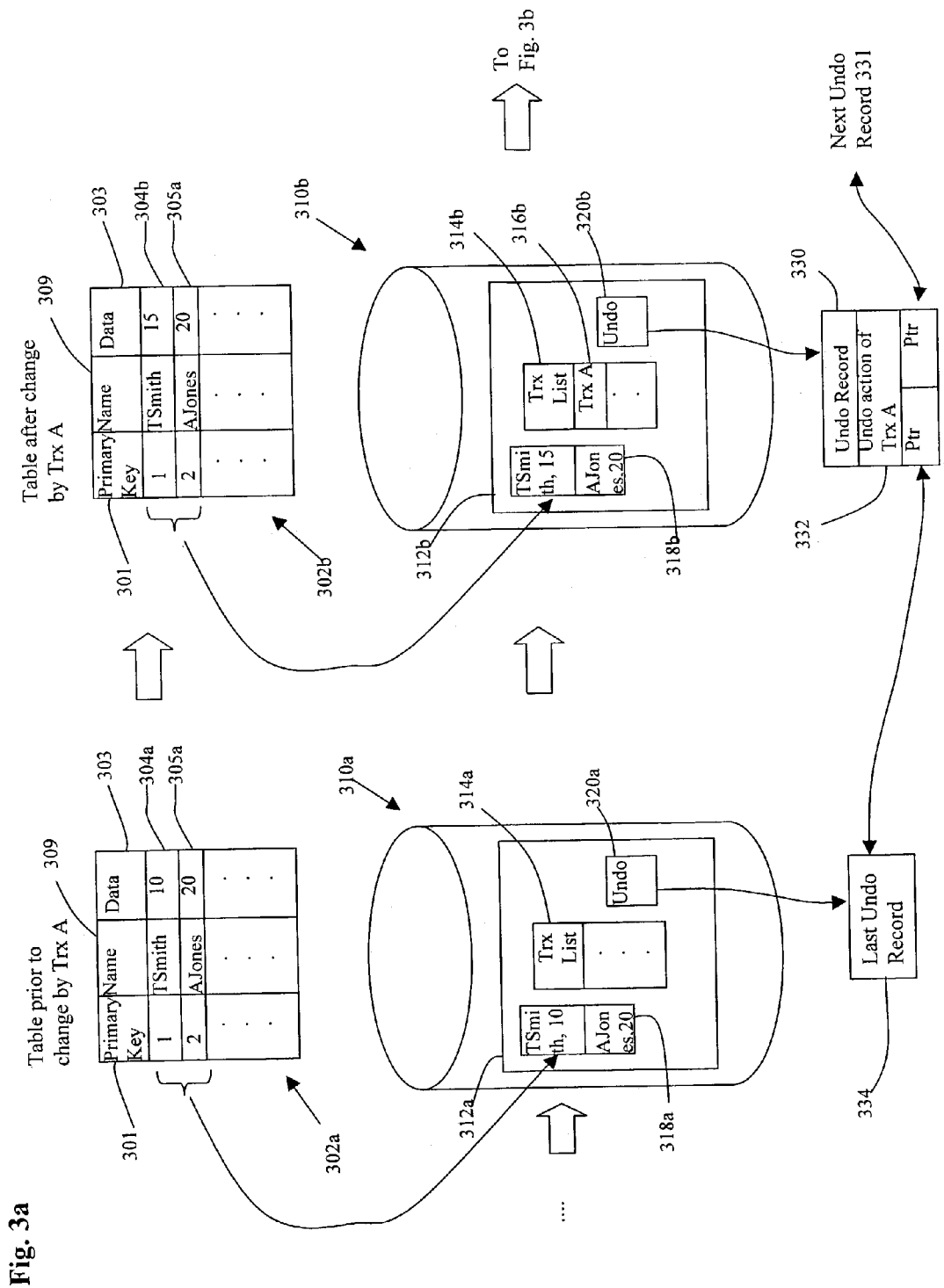
FIGS. 3a–b show log and data storage structures for an illustrated example according to an embodiment of the invention.
Figure 3B:
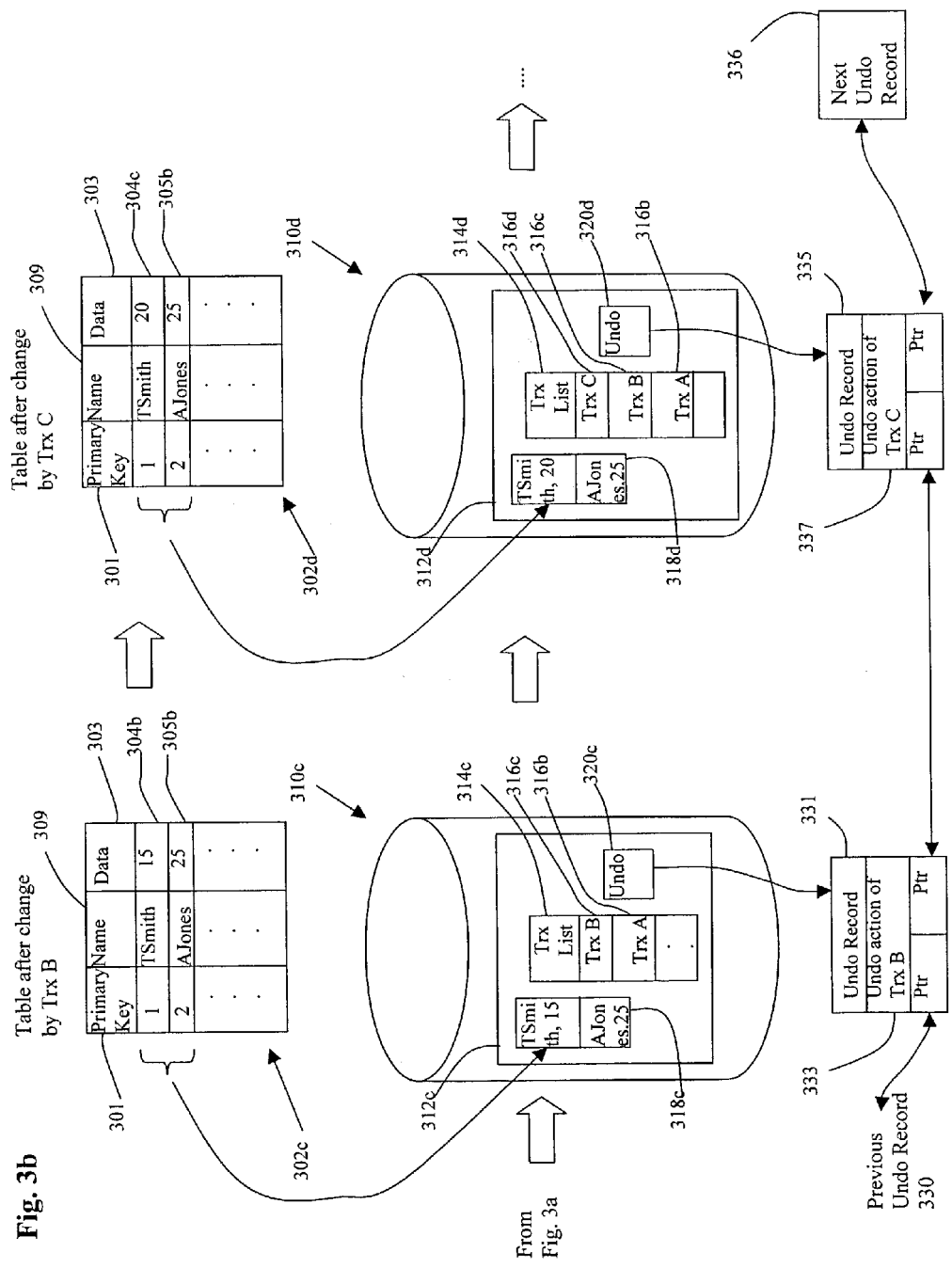

FIGS. 3a and 3b provide an illustrated example of this aspect of the present embodiment of the invention. Referring to FIG. 3a, shown is a view of a table 302a that includes a first row 304a and a second row 305a of data having a primary key column 301, a name column 309, and a data column 303. Assume that table 302a tracks account balances for bank customers. For the first row 304a, the value of the data column 303 is "10", and this row is associated with a bank customer name "TSmith" having a primary key value of "1" in the primary key column 301, e.g., which indicates that bank customer TSmith has an account balance of "10." For the second row 305a, the value of the data column 303 is "20", and this row is associated with a bank customer name "AJones" having a primary key value of "2" in primary key column 301, e.g., indicating that bank customer AJones has an account balance of "20."

Storage structure 310a shows a view of the example storage structure for table 302a. In particular, storage structure 310a comprises a block 312a having storage space 318a to store data for data rows 304a and 305a, i.e., the primary key values "1" and "2" from table 302a map these rows to database block 312a. Block 312a is associated with a transaction list 314a and a undo record pointer 320a. Undo record pointer 320a points to an undo record 334 that contains information for undoing the latest change to block 312a. While this example shows the transaction list and undo record pointer as part of the database block, it is noted that other approaches can be taken to store these structures within the scope of the invention, including storing these structures external to the database block.

Assume that a transaction TrxA applies a change to row 304a in table 302a such that the value in data column 303 for this row changes from "10" to "15". In effect, this modifies the account balance for bank customer TSmith from 10 to 15. Table 302b shows a view of the database table having a revised row 304b after this change is applied.

Storage structure 310b shows a view of the storage structure for table 302b after the change applied by TrxA. In particular, storage structure 310b comprises a revised block 312b with storage space 318b that stores data for the changed data row 304b. Block 312b is associated with a revised transaction list 314b that includes an entry 316b identifying TrxA as the latest transaction to apply a change to the block. Block 312b is also associated with a undo record pointer 320b that points to an undo record 330 that contains information for undoing the latest change to block 312b. In particular, undo record 330 include information 332 that allows block 312b to be rolled backwards to be restored to the condition of prior block 312a. At a later point in time, another transaction TrxB applies a change to table 302b such that the value in data column 303 for row 305a changes from "20" to "25". This modifies the account balance for bank customer AJones from 20 to 25. Referring to FIG. 3b, table 302c shows a view of revised row 305b for the database table after this change is applied.

Storage structure 310c shows a view of the storage structure for table 310c after to the change applied by TrxB. In particular, storage structure 310c comprises a revised block 312c having storage space 318c to store the data for changed data row 305b. Block 312c is associated with a revised transaction list 314c that includes an entry 316c identifying TrxB as the latest transaction to apply a change to the block. In this example, it can be seen that the same transaction list is used to track the multiple transactions that access the same block, even if the transactions access different rows for the block. In an alternate embodiment, multiple transaction lists are associated with the block, with each transaction list tracking a subset of the rows associated with the block. In this alternate approach, a separate transaction list can be maintained for each row (or each group of two or more rows) associated with the block.

Block 312c is associated with a undo record pointer 320c that points to an undo record 331 that contains information for undoing the latest change to block 312c. In particular, undo record 331 include information 333 that allows block 312c to be rolled backwards to be restored to the condition of prior block 312b.

At a later point in time, another transaction TrxC applies a change to table 302c such that the value in data column 303 for row 304b changes from "15" to "20". This modifies the account balance for bank customer TSmith from 15 to 20. Table 302d shows a view of revised row 304c for the database table after this change is applied.

Storage structure 310d shows a view of the storage structure for table 302d after the change applied by TrxC. In particular, storage structure 310d comprises a revised block 312d having storage space 318d to store the data for changed data row 304c. Block 312d is associated with a revised transaction list 314d that includes an entry 316d identifying TrxC as the latest transaction to apply a change to the block. Block 312d is associated with a undo record pointer 320d that points to an undo record 335 that contains information for undoing the latest change to block 312d. In particular, undo record 335 include information 337 that allows block 312d to be rolled backwards to be restored to the condition of prior block 312c.

Consider if it is desired to identify the last transaction that has modified the row of data associated with the account balance information for a given bank customer. For example, consider if it is desired to identify the last transaction that has modified the row of data for the account balance for bank customer TSmith.

As described by the process of FIG. 2, the primary key for the row of interest is to be identified. Here, the row associated with the account balance of customer TSmith is row 304c. As can be seen from table 302d in FIG. 3b, the primary key associated with this row has a value of "1". This primary key is mapped to database block 312d. Accessing block 312d, the transaction list associated with this block is transaction list 314d. If row 304c was the last modified row for the block, then the latest entry in transaction list 314d corresponds to the transaction that last modified this row. Here, the latest entry in transaction list 314d is entry 316d, which identifies transaction TrxC as the last transaction to modify the block. Therefore, an identification has been made for the last transaction, i.e., TRxC, that has modified the account balance for bank customer TSmith.

Whether the latest change to the database block has been a change the row of interest can be confirmed by accessing the most recent undo record 335 for the block. Here, undo record 335 confirms that the recent modification by transaction TrxC corresponds to a modification of row 304d corresponding to the account balance for customer TSmith, in which the account balance was changed from 15 to 20. Thus, by accessing the information in the corresponding undo record, this approach can also be used to verify the correct transaction that has last modified the data item, to identify the data values of the row at that point in history, and to identify the change that has been made by the transaction.

Consider if it is desired to identify the last transaction that has modified the data for the account balance associated with bank customer AJones, rather than bank customer TSmith. In this example, the last transaction that has modified the row of interest, e.g., for customer AJones, cannot be identified by merely identifying the last transaction that has accessed the block associated with the row. This is because, the latest transaction identified in the transaction list for the relevant database block is the transaction that has last modified the account balance for customer, which is TrxC for customer TSmith rather than TrxB customer AJones. In actual practice, there may be any number of intervening transactions that affect the database block for rows other than for the row of interest.

One approach for identifying the last transaction for the row of interest in this circumstance is to recursively apply undo records to restore prior states of the database block. As noted above, in one embodiment, the undo record contains sufficient information to restore the prior state of a database block before modification by a given transaction, including sufficient information to restore prior undo records. The restored earlier state of the undo record can be used to restore an even earlier state of the database, including an earlier undo record, which can be applied to restore an even earlier state of the database and undo record, etc. This chain of undo records can be applied to sequentially step the state of the database to each preceding database state, as far back as undo records are maintained for the database.

A prior state of the block is restored and checked to determine whether the log structures adequately identify the transaction that has modified the row of interest. If not, then the restored undo record is applied for each restored state until the state of the database corresponds to the appropriate records that identify the recent modification for the row of interest.

For the present example, it is of interest to identify the last transaction that has modified the account balance for bank customer AJones. Going to the latest version of table 302d, which tracks account balances in the example, it can be seen that the account balance for customer AJones is tracked in row 305b. The primary key for row 305b is "2", which is mapped to database block 312d. Here, the last transaction that has modified block 312d is TrxC, which has modified a different row stored in the block. This can be confirmed by accessing undo record 335, which indicates that transaction TrxC has modified row 304c rather than row 305b. Therefore, the undo record 335 is applied to restore an earlier version of the database.

In this example, applying undo records 335 will restore database block to the state shown in block 312c. Here, the latest row modified by a transaction corresponds to the row of interest, i.e., the row 305b associated with primary key "2" and user "AJones." This can be confirmed by accessing the restored undo record 331. Therefore, no further applications of undo records are needed to obtain a state of the database that includes appropriate records for the row of interest. Otherwise, if the restored state corresponds to another row that was modified, then the process continue until the appropriate state is restored for the row of interest. Since the proper state has been restored, the latest entry in the restored transaction list 314c will identify the particular transaction that has last modified the block, and which has therefore modified the row of interest 305b. For this example, the latest entry 316c in restored transaction list 314c identifies transaction TrxB as the transaction that has last modified the row of interest.

In an alternate embodiment, each transaction list may be associated with a subset of the rows in a block, e.g., in a configuration in which each row has its own dedicated transaction list. Therefore, the identified transaction list can be directly accessed to determine the last transaction that has created or modified its corresponding row without using the process of restoring a chain of prior states. The transaction list may store, for example, information relating to locks that are taken by specific transactions against the row. This approach uses more storage space for the transaction list logs than the approach of sharing a transaction list among multiple rows. However, if the present process is employed more frequently or if storage space is considered inexpensive, then it may be more efficient to associate fewer number of rows, e.g., one, with each transaction list in the block.

The approach illustrated by FIGS. 2 and 3a–b can be repeated to create a list of transactions that have made changes to a particular row. Thus, instead of stopping the process when the latest transaction that modifies the row of interest is identified, the process continues to step backwards to identify any number of transactions that have modified the row. In an embodiment, the process is configured to look back N number of transactions, in which the user determines how many transactions is wished to be viewed on the list. For instance, consider if it is desired to identify the last two transaction that have modified the account balance for bank customer TSmith in the example of FIGS. 3a–3b. The latest transaction TrxC can be identified, as discussed above, by immediately accessing the transaction list 314d, since this transaction was the latest transaction to modify the database block 312d mapped to the row of interest. The chain of undo records can be applied to identify the next earlier state of the database block corresponding to a change to the row of interest. Here, undo record 335 is applied to restore database state 310*c*. However, this state corresponds to a modification of another row. Therefore, the undo record 331 for database state 310*c* is applied to restore database state 310*b*. Here, the database state 310*b* corresponds to a modification of the row of interest. Therefore, the latest entry 315*b* in restored transaction list 314*b* is accessed to identify the transaction that has modified the database block 312*b*. Therefore, entry 316*b* identifies transaction TrxA as the next most recent transaction that has modified the row of interest. This process continues for the next N numbers of transaction that is sought to be identified.

An identification can be made regarding when a row having a given primary key has been deleted and then subsequently inserted. With this approach, the process stops when a change is identified that inserts or deleted the row. The process can thereafter recognize that a new incarnation of that row has appeared.

In another embodiment of the invention, each row can be directly associated or stored with a value that identifies the commit time of the last modification of that row, which is referred to herein as the "row system commit number" or "row-scn" value. A commit time generally refers to a monotonically increasing value that increases as commits are performed in a database system, and which is incremented for each new commit procedure. In this alternate approach, the row-scn values can be identified and used to compute whether any particular row has been subsequently modified, e.g., by determining whether the row-scn corresponds to a commit time that is after the present time or of a time-of-interest. To identify a transaction that has last operated upon a row in this approach, the row-scn is identified and used to map to the appropriate transaction associated with that commit time value. An alternate approach to identifying the latest transaction that modifies a row is to perform a full scan of the log records, e.g., by scanning either the redo or undo logs for the row of interest. However, this approach may be prohibitively expensive since a large-scale database system may create millions or billions of log records in even a short period of time.

Referring back to FIG. 1, once a transaction has been identified for which compensation or restoration is requested (104), the next step is to identify other data that is modified by the transaction (106). This is because in an embodiment, the entire set of changes made by a transaction is to be applied or unapplied as an atomic operation. Thus, all of the data modifications or inserts made by a transaction should be identified and rolled back or compensated as a unified group.

Figure 4:
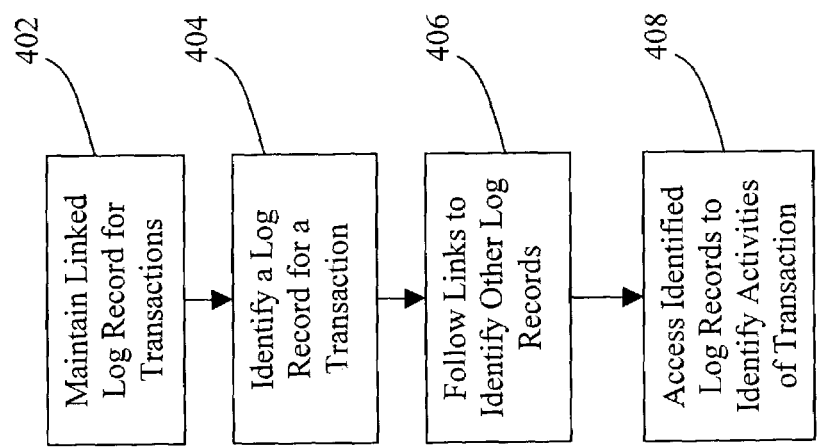
FIG. 4 shows a flowchart of a process for identifying the data items changed by a transaction according to an embodiment of the invention.

FIG. 4 shows a flowchart of a process for identifying the data changes made by a transaction according to an embodiment of the invention. At 402, the database system maintains a set of linked log records for transactions in the database system. The set of linked log records includes all changes made by transactions in the system. Any type of log structures can be employed to serve this function. Examples of such records include redo and undo log records. In one embodiment, each log records include an identifier for the transaction relating to that log record as well as a link to one or more other log records for changes made by the same transaction.

Figure 5:
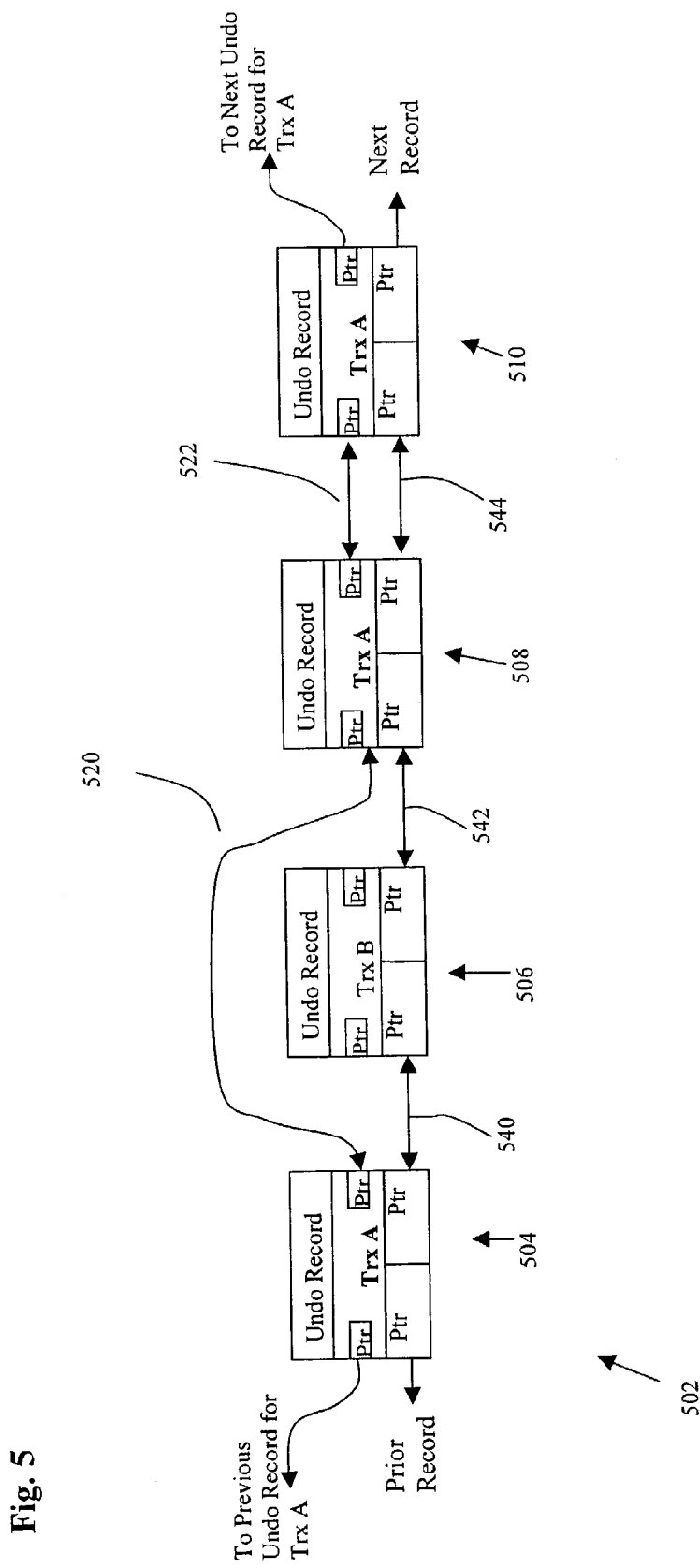
FIG. 5 shows linked log record structures according to an embodiment of the invention.

FIG. 5 shows an example implementation of a linked chain of undo log records for a transaction. This figure shows undo log records 504, 508, and 510 corresponding to transaction TrxA and an undo log record 506 corresponding to another transaction TrxB. In the approach of FIG. 5, all undo log records are chained together, regardless of the particular transaction associated with the log records. Thus, all undo log records 504, 506, 508, and 510 are linked together via pointers/links 540, 542, and 544. However, a separate chain of links is maintained for each undo record relating to the same transaction. Since undo log records 504, 508, and 510 relate to changes by the same transaction, these log records are separately linked together via pointers/links 520 and 522.

Referring back to FIG. 4, when it is desired to perform the process of identifying changes made by a particular transaction, the process identifies at least one of the log records associated with that transaction (404). This action may be performed, for example, using the process described with respect to FIGS. 2 and 3*a*–*b* in which the undo log record associated with the initially identified row is determined. Once at least one log record is identified for the transaction, all other log records for that transaction can be identified by following the chain of links for the log records (406). An example approach for linking log records is shown in FIG. 5. Each linked log record for the transaction can thereafter be accessed to identify the changes made by the transaction.

Figure 6:
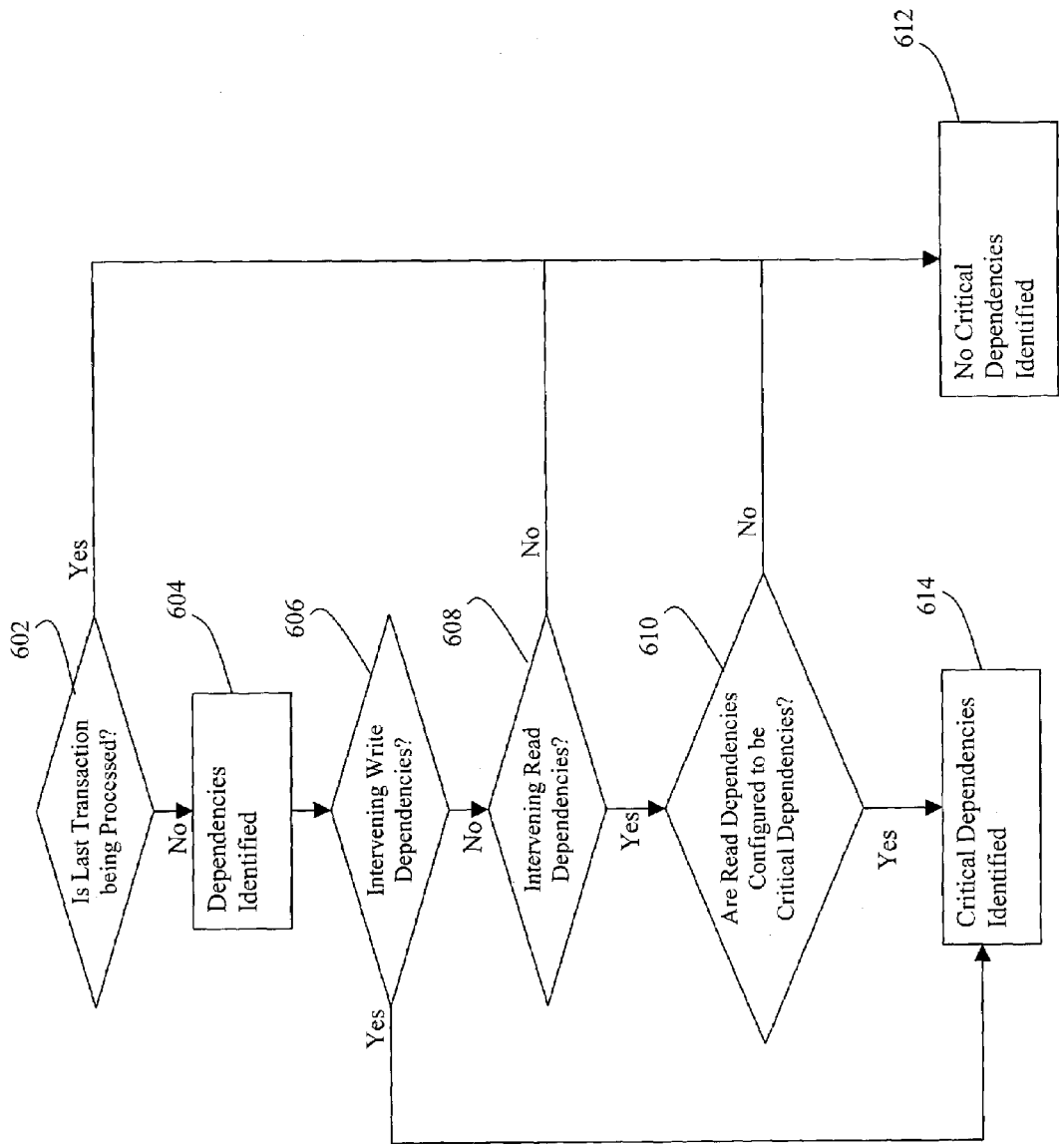
FIG. 6 shows a flowchart of a process for identifying dependencies according to an embodiment of the invention.

FIG. 6 shows a flowchart of a process for determining whether a critical dependency exists for a given transaction according to an embodiment of the invention. In one embodiment, a critical dependency exists if the undo or compensation of a transaction will affect dependencies by other transactions that introduce inappropriate errors into the database system. This may occur, for example, if a subsequent transaction makes certain types of dependent data modification, such as an increment or decrement operation, against a data item previously modified by the prior transaction.

The process described with respect to FIGS. 2 and 3*a*–*b* can be used to generate a list of transactions that have operated against a row in the database. The undo records associated with the changes for a particular row can be identified and accessed to determine the particular type of access that was made to that row (e.g., by making sure the particular lock type taken against the row is recorded and reviewing the recorded lock type during this process), as well as an identifying the particular transaction that made the access.

Each row modified by the transaction of interest can undergo this process to generate a list of transactions for that row. To determine if dependencies exist, each list of transactions for every row of the present transaction of interest is reviewed to determine if the latest transaction for that row is the same as the present transaction to be rolled back or compensated (602). If even a single row changed by the present transaction corresponds to a situation in which another, subsequent transaction had later accessed/changed/modified that row, then a dependency exists (604).

In an embodiment, an intervening write operation made by a subsequent transaction is always considered a critical dependency. Thus, if an intervening write operation by another transaction is identified (606), then a critical dependency is likewise identified (614).

In an embodiment, an intervening read operation made by a subsequent transaction can be considered either a critical dependency or not a critical dependency, depending upon the particular needs of the system to which the invention is directed. If necessary, a determination is made regarding whether intervening read accesses have occurred for the rows accessed by the present transaction (608). In an embodiment, this step is facilitated by recording read locks in the interested transaction lists for the database blocks. If intervening read accesses are considered a critical dependency (610), then any identified intermediate read operations would likewise cause a critical dependency to be identified.

Figure 7:
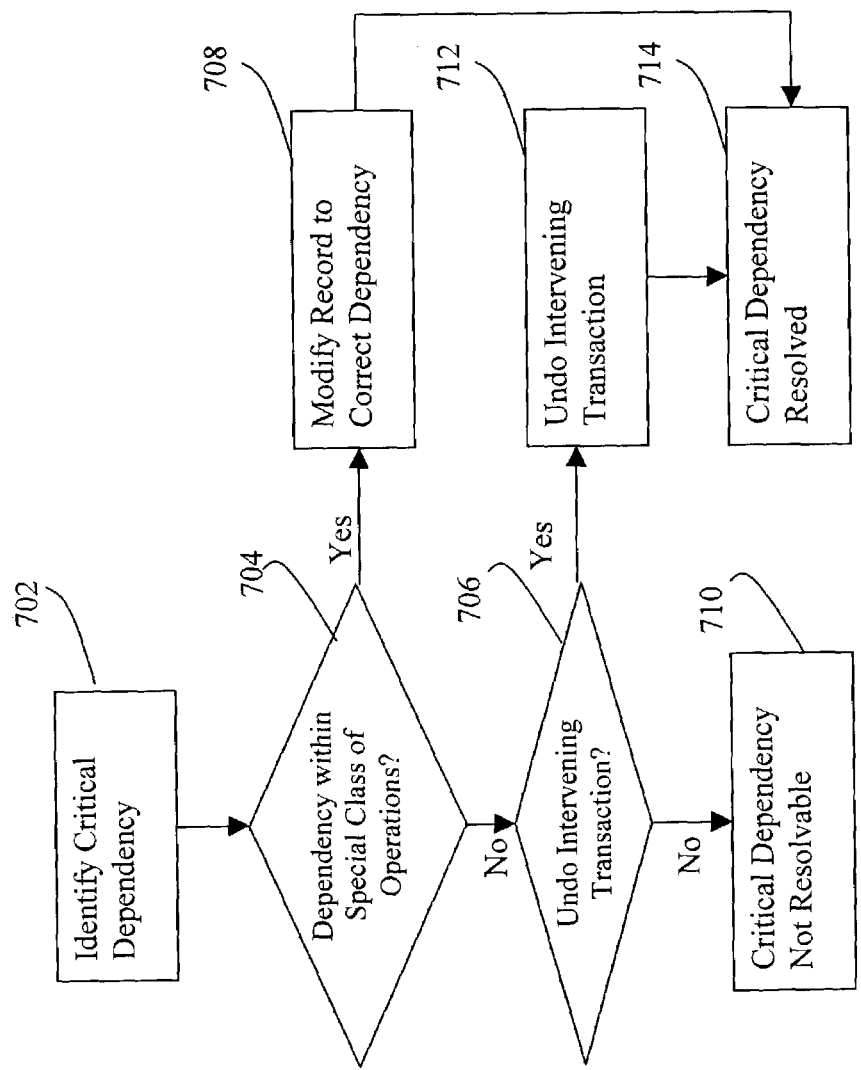
FIG. 7 shows a flowchart of a process for resolving dependencies according to an embodiment of the invention.

FIG. 7 shows a flowchart of a process for determining whether a critical dependency is resolvable according to an embodiment of the invention. At 702, a critical dependency is identified, e.g., using the process described with respect to FIG. 6.

At 704, a determination is made regarding whether the dependency is of an identified type that can be resolvable by modifying the underlying data item. If so, then the data item is modified to correct for the dependency (708). For example, the first transaction can be rolled back and the subsequent transaction can be reapplied immediately afterwards. This may occur, for example, if the second transaction performs a data operation on the data item that is not determinant upon the exact value of the data item or will still be correct even if the prior transaction is rolled back. As just one example, consider if the transaction to be compensated performed an increment or decrement operation. Any intervening modification made by a subsequent transaction has a dependency upon the value of the data item. However, by rolling back and then reapplying the subsequent operation, this value of the data item will not be in error.

Instead of, or in addition to action 704, an option may be presented to undo any intervening transaction that creates a critical dependency (706). Thus, if a subsequent transaction T2 creates a critical dependency for a prior transaction T1, the user may be presented with the option of rolling back T2, which will clear the critical dependency thereby allowing T1 to be also rolled back. It is noted that the process of rolling back or compensating for T2 is the same process for rolling back T1, but is recursively applied to this intervening transaction. T2 may itself be subject to another intervening transaction T3, which may also need to be rolled back before T2 can be rolled back, and this chain of intervening transactions may extend indefinitely.

In an embodiment, a dependency graph may be constructed based upon the list of dependencies to determine the number and extent of dependencies that exist for a particular transaction. This dependency graph traces the effects of a transaction throughout the records and subsequent transaction in the database system. A workflow graph for an organization can be constructed based upon this dependency graph to chart the progression of a business process. Moreover, this type of graph can be used to chart the history of changes to data items in the database. This graph can be used to even make an initial determination of whether a given transaction can be rolled back or compensated.

Figure 8:
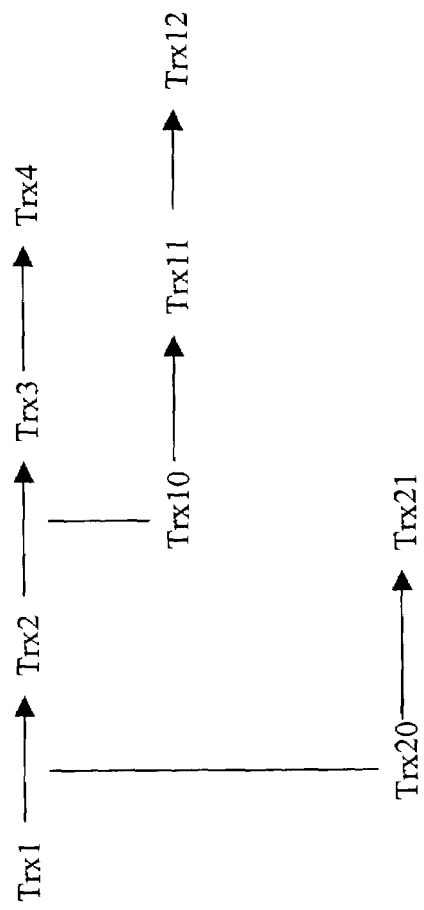
FIG. 8 shows an example dependency graph.

For example, consider sequence of transactions:
Trx1: An order is entered;
  Trx2: The order is approved;
    Trx3: The order is shipped;
      Trx4: The order is delivered;
  Trx10: The order is billed;
  Trx11: The payment is received;
    Trx12: Payment acknowledgement is processed;
Trx20: Backorder notification to distributor is performed;
  Trx21: The distributor sends new inventory;
Here, transaction Trx1 inserts a new row and transactions Trx2, Trx3, Trx4, etc all run as a workflow to modify that row. The dependency graph for this example would be as shown in FIG. 8.

If the intervening transactions can be rolled back, then the critical dependencies are resolved (714). At this point, the identified changes for the transaction can be rolled back or compensated. Otherwise, the critical dependencies are not resolved (710) and the process may be aborted.

Using the present approach, a change to the database can be restored, undone, or compensated without restoring the state of the entire database. This restoration/compensation can be performed in a manner that satisfies database consistency requirements, and which do not introduce additional conflicts or errors in the system. Different granularities of change can be implemented, merely by increasing/decreasing the number of rows/objects that become the subject of the process for restoration/compensation. In some cases, by changing only identified portions of the database rather than restoring an earlier version of the entire database, in effect a new version of the database can be created that is different from any version that has yet existed for the data.

System Architecture Overview

Figure 9:
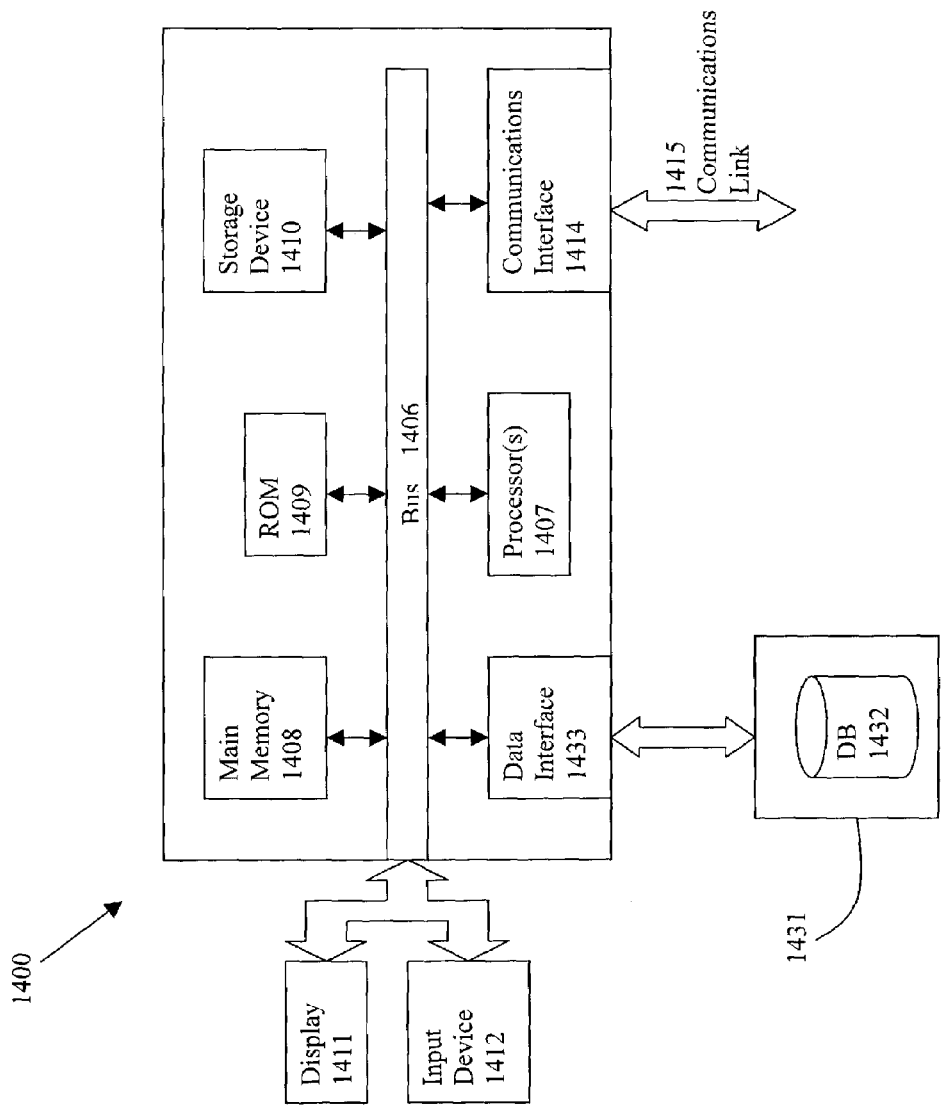
FIG. 9 is a diagram of a computer system with which the present invention can be implemented.

The execution of the sequences of instructions required to practice the invention may be performed in embodiments of the invention by a computer system 1400 as shown in FIG. 9. In an embodiment of the invention, execution of the sequences of instructions required to practice the invention is performed by a single computer system 1400. According to other embodiments of the invention, two or more computer systems 1400 coupled by a communication link 1415 may perform the sequence of instructions required to practice the invention in coordination with one another. In order to avoid needlessly obscuring the invention, a description of only one computer system 1400 will be presented below; however, it should be understood that any number of computer systems 1400 may be employed to practice the invention.

A computer system 1400 according to an embodiment of the invention will now be described with reference to FIG. 8, which is a block diagram of the functional components of a computer system 1400 according to an embodiment of the invention. As used herein, the term computer system 1400 is broadly used to describe any computing device that can store and independently run one or more programs.

Each computer system 1400 may include a communication interface 1414 coupled to the bus 1406. The communication interface 1414 provides two-way communication between computer systems 1400. The communication interface 1414 of a respective computer system 1400 transmits and receives electrical, electromagnetic or optical signals, that include data streams representing various types of signal information, e.g., instructions, messages and data. A communication link 1415 links one computer system 1400 with another computer system 1400. For example, the communication link 1415 may be a LAN, in which case the communication interface 1414 may be a LAN card, or the communication link 1415 may be a PSTN, in which case the communication interface 1414 may be an integrated services digital network (ISDN) card or a modem.

A computer system 1400 may transmit and receive messages, data, and instructions, including program, i.e., application, code, through its respective communication link 1415 and communication interface 1414. Received program code may be executed by the respective processor(s) 1407 as it is received, and/or stored in the storage device 1410, or other associated non-volatile media, for later execution.

In an embodiment, the computer system 1400 operates in conjunction with a data storage system 1431, e.g., a data storage system 1431 that contains a database 1432 that is readily accessible by the computer system 1400. The computer system 1400 communicates with the data storage system 1431 through a data interface 1433. A data interface 1433, which is coupled to the bus 1406, transmits and receives electrical, electromagnetic or optical signals, that include data streams representing various types of signal information, e.g., instructions, messages and data. In embodiments of the invention, the functions of the data interface 1433 may be performed by the communication interface 1414.

Computer system 1400 includes a bus 1406 or other communication mechanism for communicating instructions, messages and data, collectively, information, and one or more processors 1407 coupled with the bus 1406 for processing information. Computer system 1400 also includes a main memory 1408, such as a random access memory (RAM) or other dynamic storage device, coupled to the bus 1406 for storing dynamic data and instructions to be executed by the processor(s) 1407. The main memory 1408 also may be used for storing temporary data, i.e., variables, or other intermediate information during execution of instructions by the processor(s) 1407.

The computer system 1400 may further include a read only memory (ROM) 1409 or other static storage device coupled to the bus 1406 for storing static data and instructions for the processor(s) 1407. A storage device 1410, such as a magnetic disk or optical disk, may also be provided and coupled to the bus 1406 for storing data and instructions for the processor(s) 1407.

A computer system 1400 may be coupled via the bus 1406 to a display device 1411, such as, but not limited to, a cathode ray tube (CRT), for displaying information to a user. An input device 1412, e.g., alphanumeric and other keys, is coupled to the bus 1406 for communicating information and command selections to the processor(s) 1407.

According to one embodiment of the invention, an individual computer system 1400 performs specific operations by their respective processor(s) 1407 executing one or more sequences of one or more instructions contained in the main memory 1408. Such instructions may be read into the main memory 1408 from another computer-usable medium, such as the ROM 1409 or the storage device 1410. Execution of the sequences of instructions contained in the main memory 1408 causes the processor(s) 1407 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 1407. Such a medium may take many forms, including, but not limited to, non-volatile, volatile and transmission media. Non-volatile media, i.e., media that can retain information in the absence of power, includes the ROM 1409, CD ROM, magnetic tape, and magnetic discs. Volatile media, i.e., media that can not retain information in the absence of power, includes the main memory 1408. Transmission media includes coaxial cables, copper wire and fiber optics, including the wires that comprise the bus 1406. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

What is claimed is:

1. A method for identifying a transaction that accessed a data item of interest in a database system, comprising:
   identifying the data item from a database table in the database system;
   identifying a primary key of the database table which uniquely identifies a row containing the data item, in which a committed transaction previously performed a data access on the data item, and the committed transaction constitutes the transaction to be identified;
   using the primary key to identify the committed transaction from a log record comprising information relating to one or more committed transactions, each of which previously performed at least one data access on the database system containing the data item, wherein the committed transaction is identified by:
      using the primary key to determine a storage unit corresponding to the data item;
      accessing the log record associated with the storage unit; and
      identifying one of the one or more committed transactions based upon a result from the act of determining the storage unit and the act of accessing the log record; and
   displaying a result of the act of using the primary key to identify the committed transaction from a log record or storing the result in a tangible computer usable medium.

2. The method of claim 1 in which the storage unit comprises a database block in which the data item is stored.

3. The method of claim 1 in which the log record comprises a transactions list.

4. The method of claim 3 in which the transactions list is associated with multiple rows of data.

5. The method of claim 3 in which the transactions list is associated with a single row of data.

6. The method of claim 1 further comprising stepping backwards through prior versions of the storage unit until a change is identified for the data item.

7. The method of claim 6 in which undo records are applied to perform the act of stepping backwards.

8. The method of claim 1, further comprising compiling a list of committed transactions that have accessed the data item.

9. The method of claim 8 in which the last N transactions are listed for the data item.

10. A computer program product comprising a computer storage medium, said computer storage medium comprising a non-volatile media or a volatile media, and having executable code to execute a process for identifying a transaction that accessed a data item of interest in a database system, the process comprising the acts of:
   identifying the data item from a database table in the database system;
   identifying a primary key of the database table which uniquely identifies a row containing the data item in which a committed transaction previously performed a data access on the data item, and the committed transaction constitutes the transaction to be identified;
   using the primary key to identify the committed transaction from a log record comprising information relating to one or more committed transactions, each of which previously performed at least one data access on the database system containing the data item, wherein the committed transaction is identified by:

using the primary key to determine a storage unit corresponding to the data item;
accessing the log record associated with the storage unit; and
identifying one of the one or more committed transactions based upon a result from the act of determining the storage unit and the act of accessing the log record.

11. A system for identifying a transaction that accessed a data item of interest in a database system, comprising:
means for identifying the data item from a database table in the database system;
means for identifying a primary key of the database table which uniquely identifies a row containing the data item in which a committed transaction previously performed a data access on the data item, and the committed transaction constitutes the transaction to be identified;
a processor configured for using the primary key to identify a second committed transaction from a log record comprising information relating to one or more committed transactions, each of which previously performed at least one data access on the database system containing the data item;
wherein the means for using the primary key to identify the committed transaction comprises:
means for using the primary key to determine a storage unit corresponding to the data item;
means for accessing the log record associated with the storage unit; and
means for identifying one of the one or more committed transactions based upon a result from the act of determining the storage unit and the act of accessing the log record; and
a display apparatus configured for displaying a result of the act of using the primary key to identify the committed transaction from a log record or a computer usable medium configured for storing the result in a tangible computer usable medium.

12. A method for identifying a transaction that accessed a data item of interest of a database in a database system, comprising: identifying the data item of a database in the database system, in which the data item was previously accessed by a committed transaction;
identifying the committed transaction from a transaction list comprising information relating to one or more committed transactions each of which previously performed at least one data access on the database containing the data item, wherein the committed transaction is identified by:
identifying a database block of the database associated with the data item;
after the database block is identified, accessing the transaction list associated with the database block; and
wherein the act of accessing the transaction list comprises accessing an entry in the transaction list to identify one of the one or more committed transactions that previously performed the at least one data access on the database system containing the data item; and
determining whether a critical dependency exists between the committed transaction and a second committed transaction of the one or more committed transactions with respect to the data item, in which the critical dependency affects correctness of the data item identified.

13. The method of claim 12 in which the database block is rolled back to a prior state to allow identification of the committed transaction.

14. The computer program product of claim 10, wherein the process further comprises stepping backwards through prior versions of the storage unit until a change is identified for the data item.

15. The computer program product of claim 10, wherein the process further comprises compiling a list of committed transactions that have accessed the data item.

16. The method of claim 11, further comprises means for stepping backwards through prior versions of the storage unit until a change is identified for the data item.

17. The method of claim 11, further comprises means for compiling a list of committed transactions that have accessed the data item.

18. A computer program product comprising a computer storage medium, said computer storage medium comprising a non-volatile media or a volatile media, and having executable code to execute a process for identifying a transaction that accessed a data item of interest in of a database a database system, the process comprising the steps of:
identifying the data item of the database in the database system, in which the data item was previously accessed by a committed transaction;
identifying the committed transaction from a transaction list comprising information relating to one or more committed transactions each of which previously performed at least one data access on the database containing the data item, wherein the committed transaction is identified by:
identifying a database block of the database associated with the data item; and
after the database block is identified, accessing the transaction list associated with the database block,
wherein the act of accessing the transaction list comprises accessing an entry in the transaction list to identify the committed transaction from the one or more committed transactions that previously performed the at least one data access on the database containing the data item; and
determining whether a critical dependency exists between the committed transaction and a second committed transaction of the one or more committed transactions with respect to the data item, in which the critical dependency affects correctness of the data item identified.

19. The computer program product of claim 18, wherein the process further comprises rolling back the database block to a prior state to allow identification of the committed transaction.

20. A system for identifying a transaction that accessed a data item of interest of a database in a database system, comprising:
means for identifying the data item of the database in the database system, in which the data item was previously accessed by a committed transaction;
means for identifying the committed transaction from a transaction list comprising information relating to one or more committed transactions each of which previously performed at least one data access on the database containing the data item, wherein the means for identifying the committed transaction comprises:
means for identifying a database block of the database associated with the data item; and
means for accessing the transaction list associated with the database block after the database block is identified,
wherein the means for accessing comprises means for reviewing an entry in the transaction list to identify the committed transaction from the one or more the committed transaction that previously performed the at least one data access on the database containing the data item; and means for determining whether a critical dependency exists between the committed transaction and a second committed transaction of the one or more committed transactions with respect to the data item, in which the critical dependency affects correctness of the data item identified.

21. The system of claim 20, further comprising means for rolling back to a prior state to allow identification of the committed transaction.

22. The method of claim 1, wherein the result comprises the information from the log record.

23. The computer program product of claim 10, wherein the result comprises the information from the log record.

24. The system of claim 11, wherein the result comprises the information from the log record.

25. The method of claim 1, further comprising:
determining whether a critical dependency exists between the committed transaction identified and a second committed transaction with respect to the data item, in which the critical dependency affects the data item identified.

26. The method of claim 25, further comprising:
compensating for the data access to the data item performed by the committed transaction.

27. The method of claim 25, further comprising:
determining whether to execute an immediate abort.

28. The method of claim 25, further comprising:
determining whether the critical dependency is resolvable.

29. The method of claim 1, in which the critical dependency exists for the committed transaction where correctness of a subsequent transaction for the database system depends upon the data access performed by the committed transaction.

30. The method of claim 1, in which the second committed transaction is determined by selecting a latest committed transaction by accessing information contained in the log record relating to one or more committed transactions.

31. The method of claim 1, in which the log record comprises a list of one or more committed transactions, and the second log record comprises data access performed by the one or more committed transactions.

32. The method of claim 1, in which the second committed transaction constitutes the first committed transaction where the verifying whether the data access performed by the second committed transaction was performed on the data item succeeds.

33. The method of claim 1, further comprising:
applying information contained in the second log record to the database system.

34. The method of claim 12, further comprising:
applying information contained in the log record to the data item.

35. The method of claim 1, in which the log record comprises a first chain linking the committed transaction to a second committed transaction of the one or more committed transactions.

36. The method of claim 1, in which the log record further comprises:
verifying whether the at least one data access was performed on the data item of interest by comparing a second information in a second log record with the data item of interest.

37. The method of claim 12, in which the act of identifying the committed transaction from a transaction list further comprises:
verifying whether the at least one data access was performed on the data item of interest by comparing a second information in a second log record with the data item of interest.

38. The computer program product of claim 18, in which the act of identifying the committed transaction from a transaction list of the process further comprises:
verifying whether the at least one data access was performed on the data item of interest by comparing a second information in a second log record with the data item of interest.

39. The computer program product of claim 18, in which the transaction list further comprises:
a second chain linking the committed transaction to a third committed transaction of the one or more committed transactions which did not previously perform the at least one data access on the data item.

40. The system of claim 20, in which the means for identifying the committed transaction from a transaction list further comprises:
means for verifying whether the at least one data access was performed on the data item of interest by comparing a second information in a second log record with the data item of interest.

41. The system of claim 20, in which the transaction list further comprises:
a second chain linking the committed transaction to a third committed transaction of the one or more committed transactions which did not previously perform the at least one data access on the data item.

42. The computer program product of claim 10, in which the log record further comprises:
a second chain linking the committed transaction to a third committed transaction of the one or more committed transactions which did not previously perform the at least one data access on the data item.

43. The computer program product of claim 10, in which the act of identifying the committed transaction from a transaction list of the process further comprises:
verifying whether the at least one data access was performed on the data item of interest by comparing a second information in a second log record with the data item of interest.

* * * * *

UNITED STATES PATENT AND TRADEMARK OFFICE
CERTIFICATE OF CORRECTION

PATENT NO. : 8,650,169 B1  
APPLICATION NO. : 10/364209  
DATED : February 11, 2014  
INVENTOR(S) : Jacobs et al.

Page 1 of 1

It is certified that error appears in the above-identified patent and that said Letters Patent is hereby corrected as shown below:

On Title page, column 2, under Other Publications, line 1, delete "Chang" and insert -- Chiang --, therefor.

In the Claims

In column 16, line 18, in Claim 18, after "in" delete "of a database".

In column 16, line 67, in Claim 20, after "more" delete "the".

Signed and Sealed this  
Eighth Day of July, 2014

Michelle K. Lee  
*Deputy Director of the United States Patent and Trademark Office*